United States Patent

Moon et al.

(10) Patent No.: US 9,553,286 B2
(45) Date of Patent: Jan. 24, 2017

(54) BATTERY PACK FOR REDUCING DAMAGE FROM EXTERNAL STATIC ELECTRICITY

(75) Inventors: Dea-Yon Moon, Yongin-si (KR); Sang-Hun Park, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1338 days.

(21) Appl. No.: 13/304,236

(22) Filed: Nov. 23, 2011

(65) Prior Publication Data

US 2012/0214024 A1 Aug. 23, 2012

(30) Foreign Application Priority Data

Feb. 17, 2011 (KR) .................. 10-2011-0014139

(51) Int. Cl.
- *H01M 2/10* (2006.01)
- *H01M 2/20* (2006.01)
- *H01M 10/42* (2006.01)

(52) U.S. Cl.
CPC .......... *H01M 2/1061* (2013.01); *H01M 2/204* (2013.01); *H01M 10/425* (2013.01)

(58) Field of Classification Search
None
See application file for complete search history.

(56) References Cited

U.S. PATENT DOCUMENTS

| 6,524,732 B1* | 2/2003 | Iwaizono et al. ............... 429/7 |
| 8,592,062 B2 | 11/2013 | Kim |
| 2002/0142195 A1* | 10/2002 | Ehara ................ H01M 2/0215 429/7 |
| 2006/0099501 A1* | 5/2006 | Kim et al. .................. 429/174 |
| 2010/0151282 A1* | 6/2010 | Koh et al. ..................... 429/7 |
| 2011/0143172 A1* | 6/2011 | Park .............................. 429/7 |

FOREIGN PATENT DOCUMENTS

| JP | 9-73955 | 3/1997 |
| JP | 2001-266820 A | 9/2001 |
| JP | 2002-124235 | 4/2002 |
| JP | 2006-172942 A | 6/2006 |
| JP | 2007-323909 A | 12/2007 |

OTHER PUBLICATIONS

Full English Machine Translation of JP 9-73955, 26 pages.
Full English Machine Translation of JP 2002-124235, 28 pages.
Korean Office Action for KR 10-2011-0014139 dated Jul. 23, 2012 with English translation, 13 pages.

* cited by examiner

*Primary Examiner* — Miriam Stagg
*Assistant Examiner* — Carmen Lyles-Irving
(74) *Attorney, Agent, or Firm* — Lewis Roca Rothgerber Christie LLP (57) ABSTRACT

A battery pack includes: a core pack; a protection circuit module electrically connected to the core pack and including a connector for further electrically connecting to an external electronic device; and a metallic cover for covering the core pack and the protection circuit module while exposing the connector to the outside, the metallic cover including a protrusion adjacent to a ground portion of the connector.

20 Claims, 9 Drawing Sheets

BATTERY PACK FOR REDUCING DAMAGE FROM EXTERNAL STATIC ELECTRICITY

CROSS-REFERENCE TO RELATED APPLICATION

This application claims priority to and the benefit of Korean Patent Application No. 10-2011-0014139, filed on Feb. 17, 2011, in the Korean Intellectual Property Office, the disclosure of which is incorporated herein in its entirety by reference.

BACKGROUND

1. Field

One or more embodiments of the present invention relate to battery packs.

2. Description of Related Art

Along with the development of wireless internet and advances in communication technology, more and more portable computers and other devices that operate using batteries rather than other types of power supplying units are being rapidly developed. In general, portable computers are compact and easy to carry, and thus are widely used for business and personal purposes. Portable computers may contain internal battery packs, so as to facilitate use in a variety of places without having to locate other power supplying devices. Also, internal battery packs may include secondary batteries, which are rechargeable.

SUMMARY OF THE INVENTION

One or more embodiments of the present invention include battery packs having a reduced thickness, for example, by using a metallic cover, and being capable of preventing or reducing damage, for example, from external static electricity.

Additional aspects will be set forth in part in the description which follows and, in part, will be apparent from the description, or may be learned by practice of the presented embodiments.

According to one or more embodiments of the present invention, a battery pack includes: a core pack; a protection circuit module electrically connected to the core pack and including a connector for further electrically connecting to an external electronic device; and a metallic cover for covering the core pack and the protection circuit module while exposing the connector to the outside, the metallic cover including a protrusion adjacent to a ground portion of the connector.

The battery pack may further include an insulating layer between the metallic cover and the protection circuit module.

An inner surface of the metallic cover may be electrically insulated. An oxide coating layer may be on the inner surface of the metallic cover. An insulation tape may be on the inner surface of the metallic cover.

The metallic cover may include stainless steel.

The metallic cover may include: a first cover for covering the core pack from a first side; and a second cover for covering the core pack from a second side opposite to the first side, wherein a portion of each of the first cover and the second cover is open to expose the connector to the outside. The protrusion may be on at least one of the first cover or the second cover. The battery pack may further include a frame for accommodating the core pack and the protection circuit module and for coupling with the first cover and the second cover.

According to one or more embodiments of the present invention, a battery pack includes: a core pack; a protection circuit module electrically connected to the core pack and including a connector for further electrically connecting to an external electronic device; a frame for accommodating the core pack and the protection circuit module; and a metallic cover for covering the core pack and the protection circuit module while exposing the connector to the outside, the metallic cover including a protrusion adjacent to a ground portion of the connector.

The battery pack may further include an insulating layer between the metallic cover and the protection circuit module.

The metallic cover may include: a first cover positioned at a first side of the frame, wherein a portion of the first cover is open to expose the connector to the outside; and a second cover positioned at a second side of the frame, wherein a portion of the second cover is open to expose the connector to the outside. The protrusion may be on at least one of the first cover of the second cover and may be configured to contact the ground portion of the connector.

The frame may include a first area for accommodating the core pack and a second area for accommodating the protection circuit module, wherein the second area includes at least one surface facing the metallic cover that may be at least partially open. The battery pack may further include an insulating layer configured to cover the at least one open surface of the second area.

The frame may include an insulating material.

The metallic cover may include stainless steel.

An inner surface of the metallic cover may be electrically insulated. An oxide coating layer may be on the inner surface of the metallic cover. An insulation tape may be on the inner surface of the metallic cover.

BRIEF DESCRIPTION OF THE DRAWINGS

These and/or other aspects will become apparent and more readily appreciated from the following description of the embodiments, taken in conjunction with the accompanying drawings, of which.

DETAILED DESCRIPTION OF THE EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below to explain aspects of the present description.

The advantages and characteristics of the present invention, and the method of achieving the same will be become more clear by referring to the accompanying drawings and exemplary embodiments described in detail below. However, the present invention is not limited to the exemplary embodiments described hereinafter, but may be embodied in various alternate forms; these embodiments are provided so that this disclosure will be thorough and complete, and will fully convey the concept of the invention to those skilled in the art, while the present invention is defined by the scope of the claims.

The terms used in the present specification are merely used to describe particular embodiments, and are not intended to limit the present invention. An expression used singularly may also encompass the plural of the expression, unless it has a clearly different meaning in context. While such terms as "first," "second," etc., may be used to describe various components, such components should generally not be limited to the above terms. The above terms are generally used only to distinguish one component from another.

Figure 1:
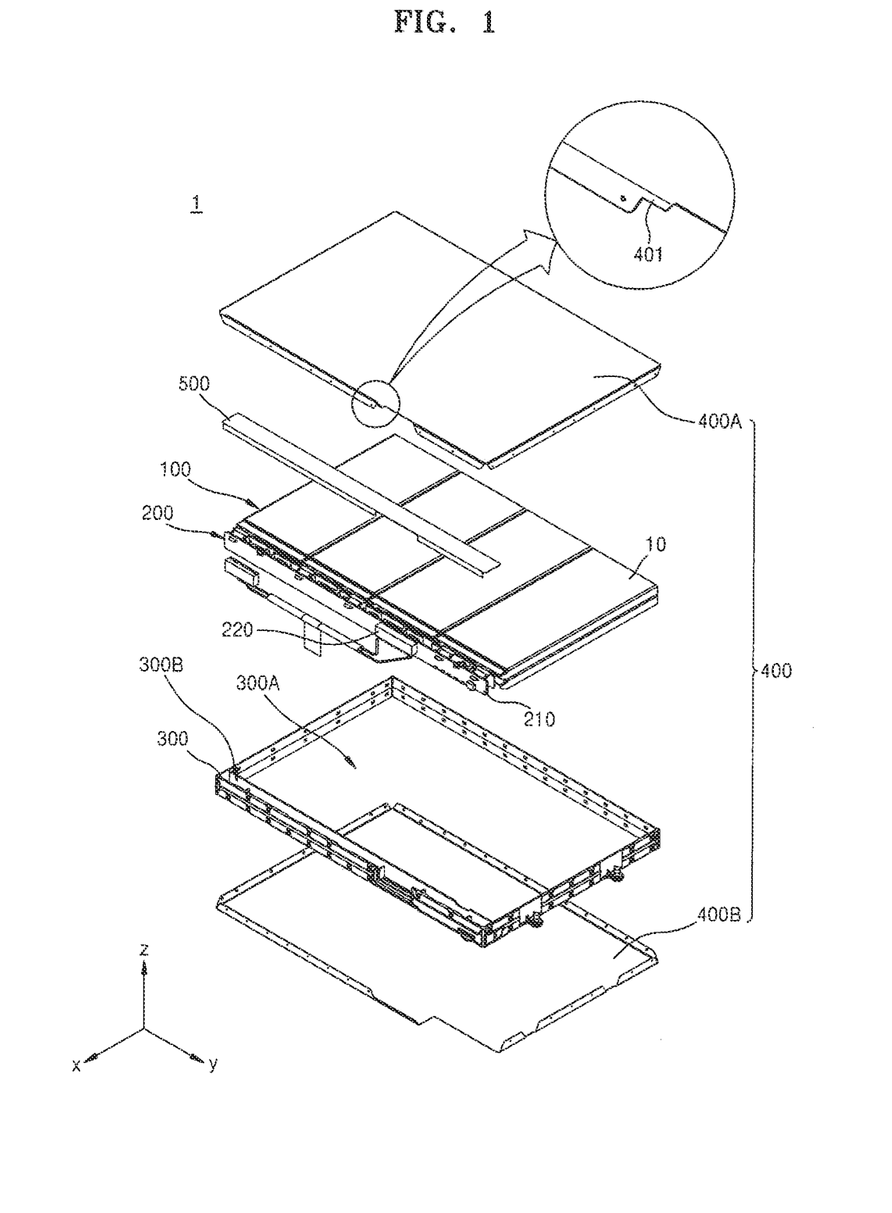
FIG. 1 is a schematic exploded perspective view illustrating a battery pack according to an embodiment of the present invention.
Figure 2:
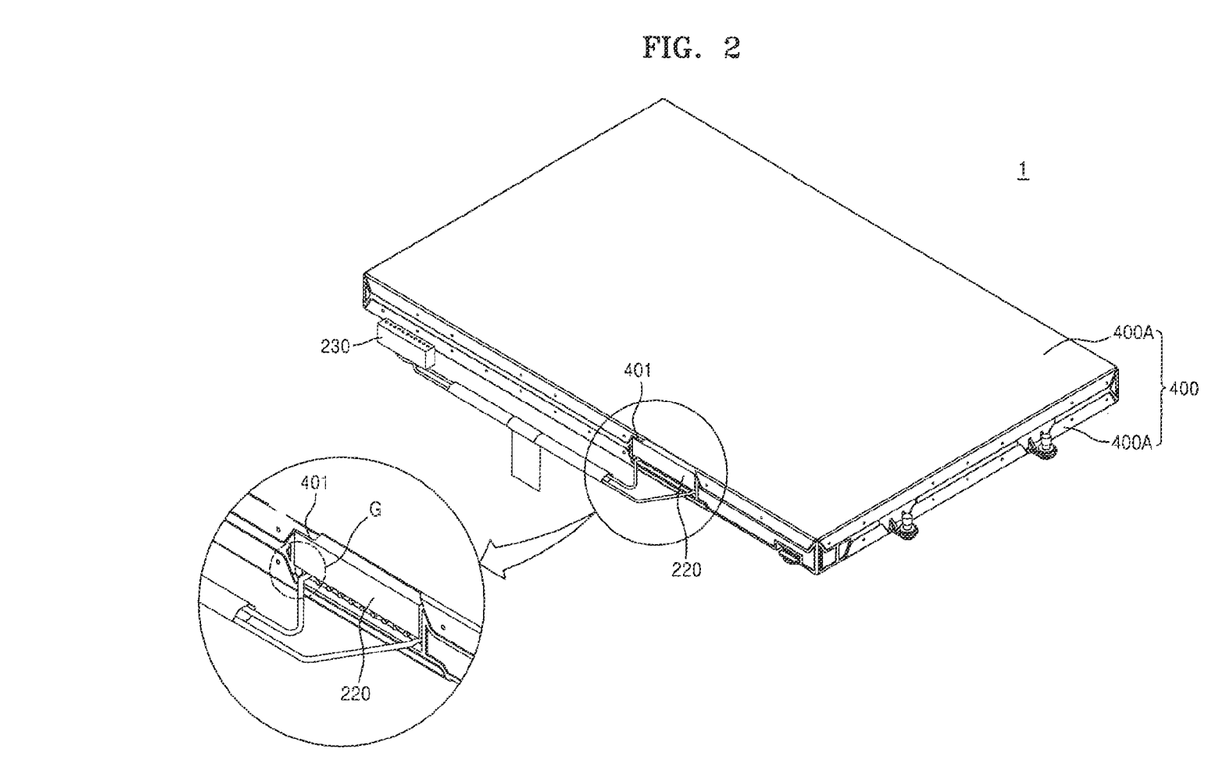
FIG. 2 is a perspective view of the battery pack of FIG. 1 in an assembled state.

FIG. 1 is a schematic exploded perspective view illustrating a battery pack 1 according to an embodiment of the present invention. FIG. 2 is a perspective view of the battery pack 1 in an assembled state.

Referring to FIG. 1, the battery pack 1 includes a core pack 100, a protection circuit module (PCM) 200, a frame 300, a metallic cover 400, and an insulating layer 500.

The core pack 100 may include a unit cell 10 that is rechargeable. In some embodiments, the core pack 100 may include at least two unit cells 10. The unit cells 10 may be secondary batteries. For example, the unit cells 10 may be lithium ion batteries or polymer type batteries.

A plurality of unit cells 10 may be connected in series or in parallel to one another to form the core pack 100. For example, the core pack 100 may be formed by serially connecting four groups of two unit cells 10 that are each connected in parallel.

In one embodiment, eight unit cells 10 form one core pack 100. However, the number and connection properties of the unit cells 10 forming the core pack 100 are not limited thereto, and both may vary. The core pack 100 may supply power to various types of electronic devices. For example, the core pack 100 may supply power to a laptop computer or an electric machine or tool.

The protection circuit module 200 may be electrically connected to the core pack 100. The protection circuit module 200 may prevent or reduce overheating and/or occurences of explosions due to over-current, overcharge, or overdischarge of the core pack 100. The protection circuit module 200 may include a substrate 210 that can be positioned at a side of the core pack 100 and a protection device (not shown), for example, mounted inside the substrate 210. The protection device may include a safety device such as a passive device (e.g., a resistor or condenser) or an active device (e.g., a field electric transistor), or an integrated circuit. The protection device may include a positive temperature coefficient (PTC) device.

A connector 220 is positioned on a side of the substrate 210 to facilitate an electrical connection with an electronic device such as a laptop computer. In this case, the connector 220 may include a ground portion G, a temperature terminal, a data terminal, a clock terminal, and positive and negative electrode terminals (not shown). A reference numeral 230 denotes an auxiliary connector which may aid or assist in the electrical connection between the connector 220 and the electronic device.

In the current embodiment, the protection device may be mounted on or inside the substrate 210, but the embodiment is not limited thereto. For example, the protection device may be positioned on the substrate 210 and exposed thereon.

The frame 300 may accommodate the core pack 100 and the protection circuit module 200. A structure of the frame 300 will be described in further detail with reference to FIGS. 3 and 4 below.

The metallic cover 400 may accommodate or house the core pack 100 by, for example, being coupled to the frame 300. The metallic cover 400 has an effect of reducing the total thickness of the battery pack 1. The metallic cover 400 may include a stainless steel (SUS), and may have a thickness of about 0.25 mm.

An inner surface of the metallic cover 400 is electrically insulated. For example, the inner surface of the metallic cover 400 may be insulated by attaching or covering the surface with an insulating tape. Alternatively, an oxide coating layer may be formed on the inner surface of the metallic cover 400 through an anodizing process, in order to insulate the inner surface of the metallic cover 400.

The metallic cover 400 may include a first cover 400A and a second cover 400B that are positioned respectively on a first side and a second side of the frame 300. The first cover 400A may, for example, cover the core pack 100 from above, and the second cover 400B, may, for example, cover the core pack 100 from below. The first cover 400A and the second cover 400B may have a substantially rectangular shape corresponding to a shape of the core pack 100. In this case, edges of the first cover 400A and the second cover 400B may be curved so as to be coupled to side surfaces of the frame 300, and portions of side surfaces of the first cover 400A and the second cover 400B may be opened in order to expose the connector 220 to the outside.

While the metallic cover 400 has an effect of reducing the total thickness of the battery pack 1, the metallic cover 400 may be exposed to external static electricity, which may damage the battery pack 1. In order to prevent or reduce damage due to static electricity, a protrusion 401 is formed on the metallic cover 400. Referring to FIG. 2, the protrusion 401 is adhered to the ground portion G of the connector 220. The protrusion 401 has a structure that helps to bypass or dissipate external static electricity, where the external static electricity is discharged to the outside via the ground portion G of the connector 220 adjacent to the protrusion 401.

In the current embodiment, the protrusion 401 is formed on the first cover 400A, but the embodiment of the present invention is not limited thereto. As long as the protrusion 401 is adhered to the ground portion G of the connector 220, the protrusion 401 may be formed on the second cover 400B instead of or in addition to the first cover 400A.

In the current embodiment, the metallic cover 400 includes two portions and is positioned above and below the core pack 100 (e.g., as illustrated in FIG. 2), but the present invention is not limited thereto. For example, the cover 400 may be a single piece or may have three or more pieces.

The insulating layer 500 is positioned between the protection circuit module 200 and the cover 400. The protection circuit module 200 may be vulnerable to static electricity, and thus, if the metallic cover 400 is charged with external static electricity and then the static electricity is discharged or transferred to the protection circuit module 200, the protection circuit module 200 may be damaged. To prevent or reduce this, the insulating layer 500 is positioned between the protection circuit module 200 and the cover 400, and may be curved in an L-shape along a direction in which the protection circuit module 200 is also positioned, so as to surround the protection circuit module 200 and separate it from the cover 400.

Figure 3:
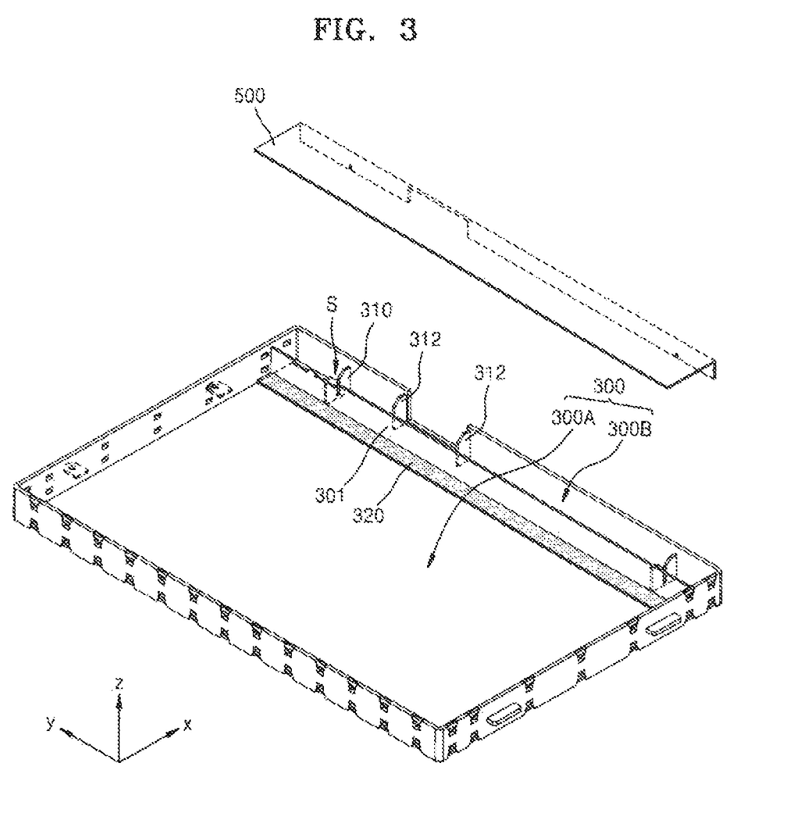
FIG. 3 is a perspective view illustrating a frame and an insulating layer of the battery pack of FIG. 1.
Figure 4:
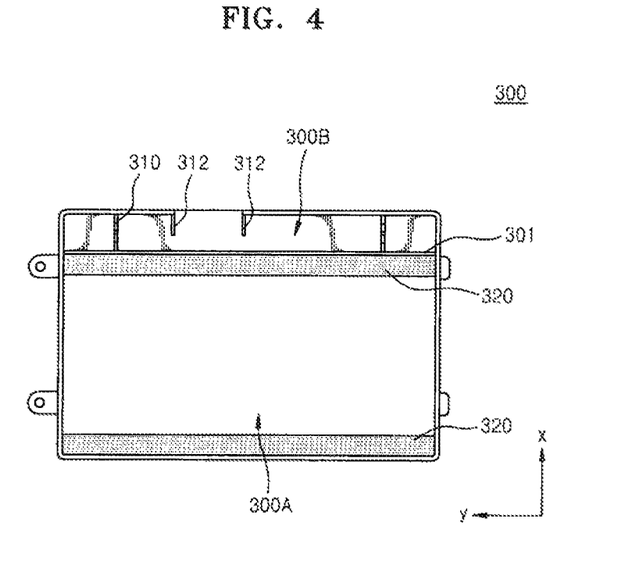
FIG. 4 is a plan view illustrating the frame of FIG. 3, seen from above.

FIG. 3 is a perspective view illustrating the frame 300 and the insulating layer 500 of the battery pack 1. FIG. 4 is a plan view illustrating the frame 300 of FIG. 3 seen from above.

Referring to FIGS. 3 and 4, the frame 300 may have a substantially rectangular shape, and may be in the form of a band to surround side surfaces of the core pack 100. At least one of the upper or lower portions of the frame 300 may be open so that the core pack 100 and the protection circuit module 200 can be inserted into the frame 300. If the upper and lower portions of the frame 300 are both open, a thickness of the frame 300 may be further reduced, and thus the total thickness of the battery pack 1 may be reduced. The frame 300 may include an insulating material. For example, a polymer compound that can be molded by heat or pressure may be used to form the frame 300.

The frame 300 may be partitioned into a first area 300A and a second area 300B by sidewalls.

The first area 300A is a space for accommodating the core pack 100, and may have open upper and lower portions. A core pack supporting portion 320 extending from the second area 300B supports the core pack 100 and may be formed to cover a portion of the lower portion of the first area 300A.

The second area 300B is a space for accommodating the protection circuit module 200, and has an opened upper portion. A lower portion of the second area 300B is not opened but closed, and is connected to the core pack supporting portion 320. A PCM supporting portion 310 for supporting the protection circuit module 200 is formed in the second area 300B. The PCM supporting portion 310 may be arranged to be substantially vertical (e.g., substantially perpendicular) to a sidewall 301, and includes a slit S so that the substrate 210 of the protection circuit module 200 can be inserted therein. The PCM supporting portion 310 is respectively arranged on two sides of the second area 300B, and supports the protection circuit module 200 from the sides of the second area 300B.

A portion of a side of the frame 300 is open so as to expose the connector 220 to the outside. A guide portion 312 may be included on an inner surface of the frame 300 where the connector 220 is positioned, in order to guide the connector 220 into position. The guide portion 312 may also insulate the connector 220 from the protection circuit module 200.

The second area 300B is physically separated from the first area 300A via the sidewall 301, such that even if an electrolyte solution leaks from the core pack 100, leakage of the electrolyte solution into the second area 300B may be prevented or reduced.

The insulating layer 500 may be positioned above the second area 300B. Since the frame 300 includes an insulating material, and the lower portion of the second area 300B is closed, the protection circuit module 200 is protected by being substantially electrically insulated from the second cover 400B. However, since the upper portion of the second area 300B is open, the protection circuit module 200 may be facing the first cover 400A through the open upper portion of the second area 300B. In this case, absent an intervening layer, if the first cover 400A is charged with external static electricity and the static electricity is discharged or transferred to the protection circuit module 200, the protection circuit module 200 may be damaged. Thus, the insulating layer 500 can be positioned between the first cover 400A and the protection circuit module 200 in order to substantially protect the protection circuit module 200 from damage from static electricity.

Figure 5:
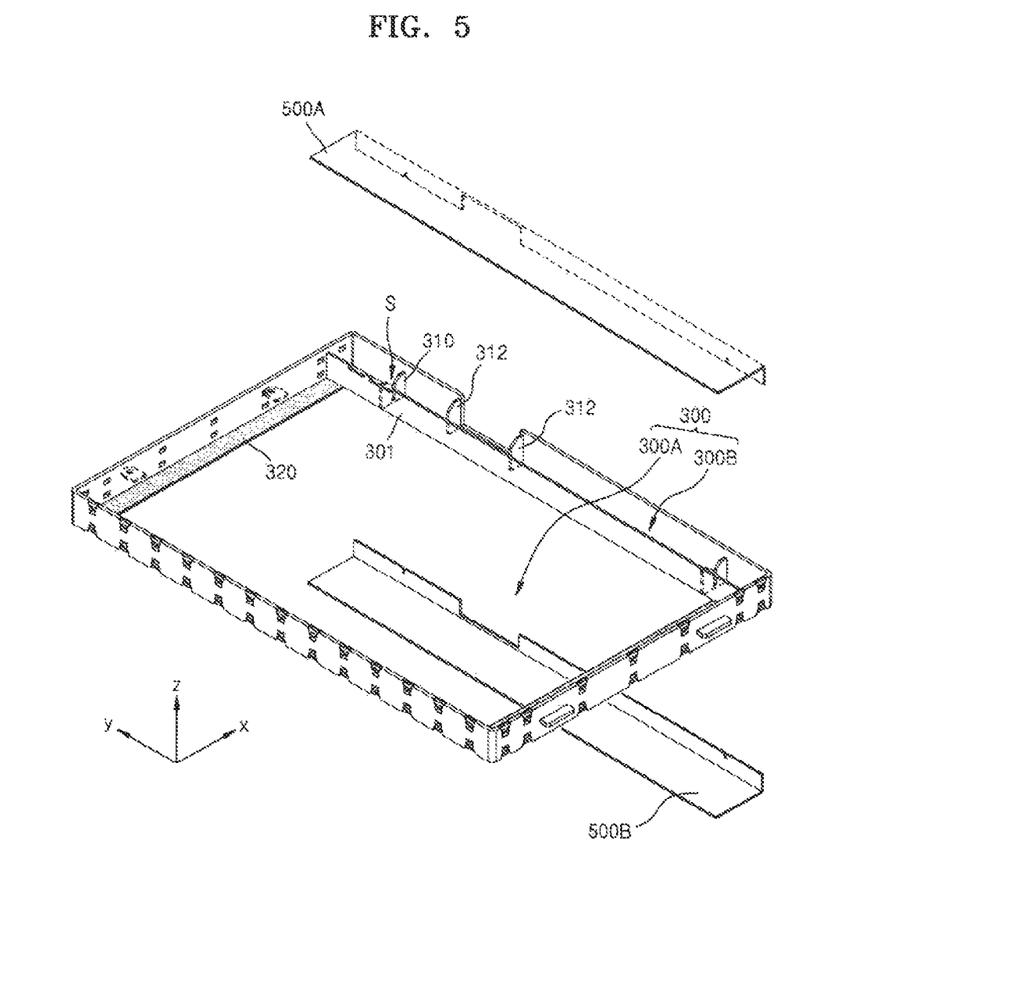
FIG. 5 is a perspective view illustrating a frame and an insulating layer of a battery pack according to another embodiment of the present invention.
Figure 6:
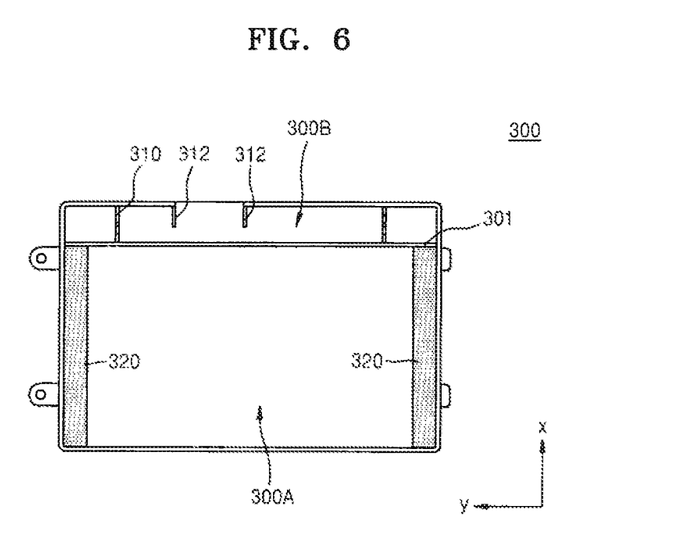
FIG. 6 is a plan view illustrating the frame of FIG. 5, seen from above.

FIG. 5 is a perspective view illustrating a frame 300 and insulating layers 500A and 500B of a battery pack 1 according to another embodiment of the present invention. FIG. 6 is a plan view illustrating the frame 300 of FIG. 5 seen from above.

Referring to FIGS. 5 and 6, the frame 300 is similar to the frame 300 described with reference to FIGS. 3 and 4, in that the frame 300 is also partitioned or separated by a sidewall 301 into a first area 300A for accommodating a core pack 100 and a second area 300B for accommodating a protection circuit module 200. Further, a guide portion 312 formed on an inner wall of the frame 300 guides a connector 220 into position and insulates the connector 220 from the protection circuit module 200, and a PCM supporting portion or portions 310 formed in the second area 300B include a slit S for supporting the protection circuit module 200.

However, the frame 300 of FIGS. 5 and 6 is different from the frame 300 in FIGS. 3 and 4 in that both an upper portion and also a lower portion of the second area 300B are open, and that a core pack supporting portion 320 of the first area 300A extends in a direction perpendicular to a direction in which the sidewall 301 extends.

The core pack supporting portion 320 formed in the first area 300A may be extended in a direction perpendicular to a direction in which the sidewall 301 extends. Though a lower portion of the first area 300A is open, the core pack supporting portion 320 prevents the core pack 100 from separating from the frame 300 through the lower portion of the first area 300A. However, so long as the core pack supporting portion 320 is configured or positioned to prevent the core pack 100 from separating from the frame 300, the location of the core pack supporting portion 320 can be varied or rearranged. For example, the core pack supporting portion 320 may be arranged such that the lower portion of the first area 300A may not be open. Alternatively, the core pack supporting portion 320 may be positioned at four corners of the first area 300A, among other arrangements.

The upper and lower portions of the second area 300B may be open. Here, the PCM supporting portion 310 supporting the protection circuit module 200 is formed in the second area 300B as a single unit connected to the sidewall 301 and the inner side wall of the frame 300, thereby supporting the protection circuit module 200. The protection circuit module 200 is inserted into the slit S of the PCM supporting portion 310, similarly as described above.

The insulating layers 500A and 500B may be formed above and below the second area 300B. In the current embodiment, the upper and lower portions of the second area 300B are opened, and thus, the protection circuit module 200 faces and is exposed to the first cover 400A and the second cover 400B. In this case, if the first cover 400A or the second cover 400B is charged with external static electricity and the static electricity is discharged or transferred to the protection circuit module 200, the protection circuit module 200 may be damaged. Therefore, the insulating layers 500A and 500B may be positioned between the protection circuit module 200 and first and second covers 400A and 400B, respectively, in order to prevent or reduce static electricity from reaching the protection circuit module 200.

Figure 7:
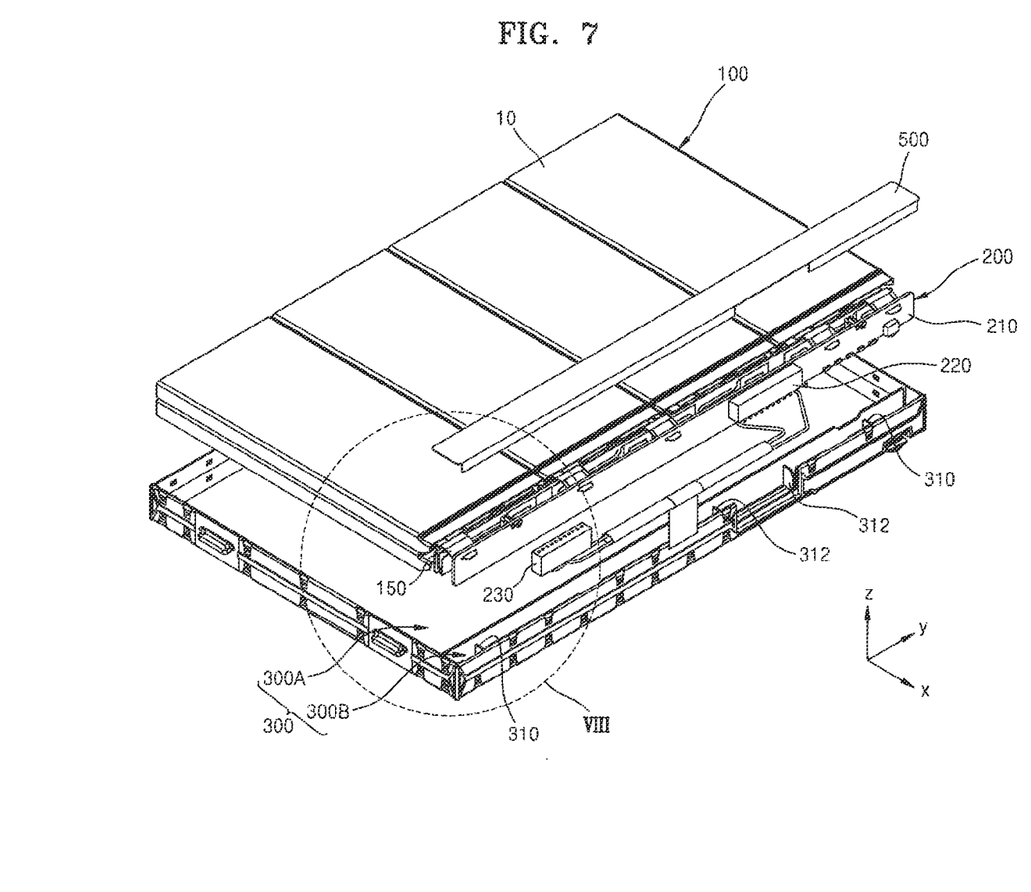
FIG. 7 is a schematic exploded perspective view illustrating the frame, a core pack, and a protection circuit module of the battery pack of FIG. 1 in a coupled state.
Figure 8:
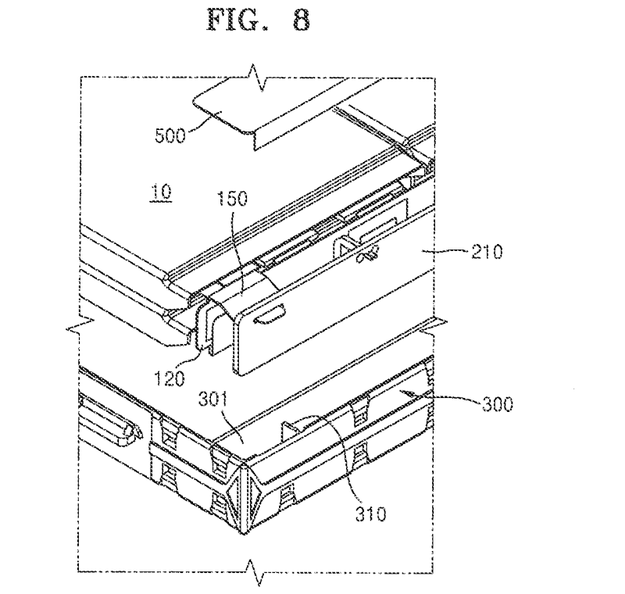
FIG. 8 is a schematic exploded perspective view illustrating a portion VIII of FIG. 7.
Figure 9:
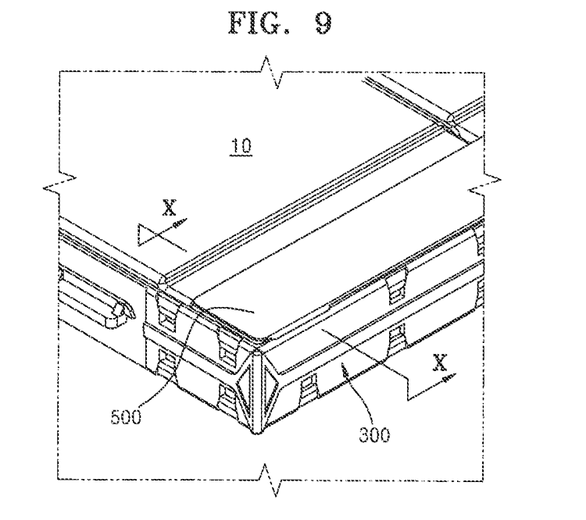
FIG. 9 is a schematic perspective view illustrating the portion VIII of FIG. 7 in a coupled state.

FIG. 7 is a schematic exploded perspective view illustrating the core pack 100, the protection circuit module 200, the frame 300, and the insulating layer 500 of the battery pack of FIG. 1. FIG. 8 is a schematic exploded perspective view illustrating a portion VIII of FIG. 7. FIG. 9 is a schematic perspective view illustrating the portion VIII of FIG. 7 in a coupled state.

The core pack 100 and the protection circuit module 200 may be electrically connected to each other via one or more connection tabs 150. A first end of the connection tab 150 may be connected to the core pack 100, and a second end of the connection tab 150 may be connected to the protection circuit module 200. The connection tab 150 and the protection circuit module 200 may be connected to each other by, for example, soldering.

The core pack 100 includes the plurality of the unit cells 10, and the unit cells 10 each include an electrode that is extended in a predetermined direction, where the electrode may be electrically connected to an electrode connecting member 120 via physical contact. Here, the connection tab 150 may be integrally formed with the electrode connection member 120, and thus the core pack 100 and the protection circuit module 200 may be electrically connected to each other via the connection tab 150. The connection tab 150 may be or include a conductor such as nickel.

Adjacent to the side wall 301, the protection circuit module 200 is accommodated in the second area 300B, and the electrode connection member 120 and the core pack 100 are accommodated in the first area 300A. The connection tab 150 is bridged over the first area 300A and the second area 300B, and may pass over the side wall 301.

After the core pack 100 and the protection circuit module 200 are accommodated in the frame 300, the insulating layer 500 is positioned to cover the protection circuit module 200. As described above, the insulating layer 500 may be curved or bent in an L-shape to cover not only an upper portion but also a part of the side portion of the protection circuit module 200.

Figure 10:
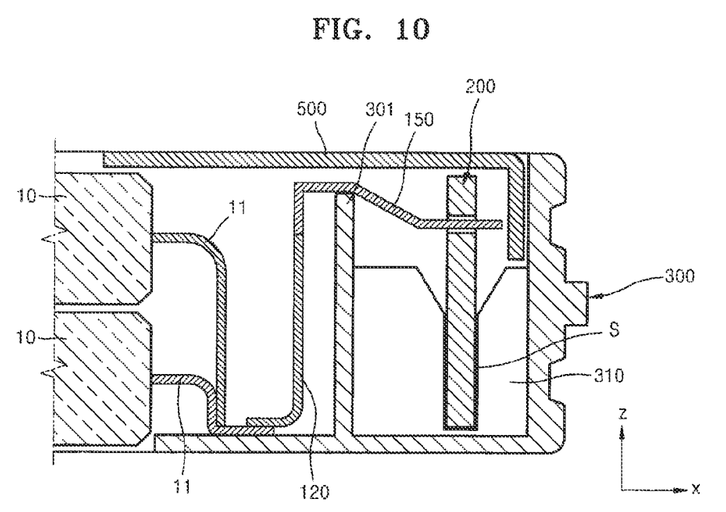
FIG. 10 is a cross-sectional view illustrating the battery pack of FIG. 9 cut along a line X-X.
Figure 11:
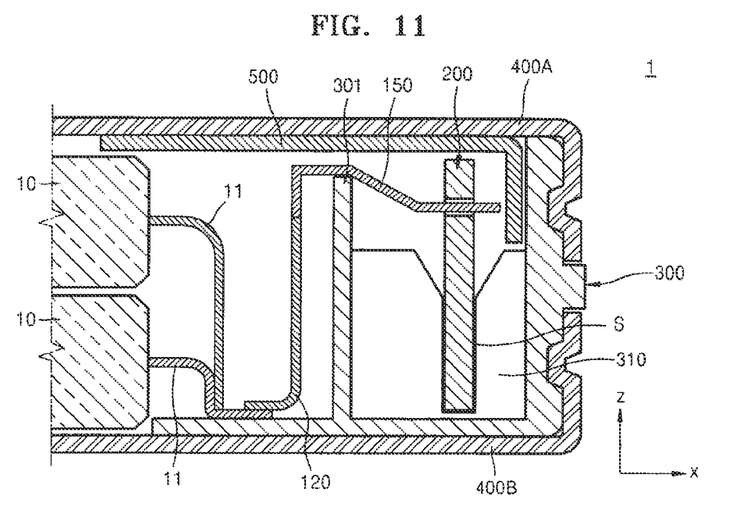
FIG. 11 is a cross-sectional view illustrating the battery pack of FIG. 10 including a first cover and a second cover.

FIG. 10 is a cross-sectional view illustrating the battery pack 1 cut along a line X-X. FIG. 11 is a cross-sectional view illustrating the battery pack 1 including the first cover 400A and the second cover 400B.

Referring to FIGS. 10 and 11, the core pack 100 is accommodated in the first area 300A partitioned from the second area 300B by the side wall 301, and the protection circuit module 200 is inserted in the slit S of the PCM supporting portion 310 in the second area 300B. The electrodes 11 of the core pack 100 are electrically connected to the protection circuit module 200 via the electrode connection member 120 and the connection tab 150. The protection circuit module 200 is accommodated in the second area 300B, and the insulating layer 500 covers the upper portion of the protection circuit module 200, such that the protection circuit module 200 is substantially surrounded by insulating material.

The first cover 400A and the second cover 400B are coupled to the frame 300 to cover the core pack 100 from above and below. The insulating layer 500 is interposed between the first cover 400A and the protection circuit module 200, while another side of the frame 300 is formed between the second cover 400B and the protection circuit module 200. Accordingly, external static electricity may be prevented or reduced from passing from the first cover 400A and the second cover 400B to the protection circuit module 200.

According to embodiments of the present invention, as the protrusion 401 and the insulating layer 500 are included, electrostatic discharge (ESD) intensity to the outside may be about ±21 kV, whereas when the protrusion 401 and the insulating layer 500 are not included, ESD intensity may be lower (e.g., less effective) at about ±8 kV.

According to embodiments of the present invention, as a protrusion on a metallic cover is closely adhered to a ground portion of a connector, external static electricity is more effectively discharged outside via the ground portion. In addition, since an insulating layer is formed between a protection circuit module and the metallic cover, damage to the protection circuit module due to external static electricity may be prevented or reduced.

It should be understood that the exemplary embodiments described herein should be considered in a descriptive sense only and not for purposes of limitation. Descriptions of features or aspects within each embodiment should also be considered as available or interchangeable with other similar features or aspects in other embodiments.

While this invention has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A battery pack comprising:
   a core pack;
   a protection circuit module electrically connected to the core pack and comprising a connector for further electrically connecting to an external electronic device; and
   a metallic cover for covering the protection circuit module and the core pack while being electrically insulated from an outer surface of the core pack, wherein the metallic cover comprises an upper surface, a first side surface, and a second side surface, wherein the first and second side surfaces are each bent from the upper surface to cover the protection circuit module, are positioned on a same plane, are separate and are spaced apart from one another, such that the connector is exposed through a gap between the first side surface and the second side surface, and wherein one of the first side surface or the second side surface comprises a protrusion adjacent to a ground portion of the connector.

2. The battery pack of claim 1, further comprising an insulating layer between the metallic cover and the protection circuit module.

3. The battery pack of claim 1, wherein an inner surface of the metallic cover is electrically insulated.

4. The battery pack of claim 3, wherein an oxide coating layer is on the inner surface of the metallic cover.

5. The battery pack of claim 3, wherein an insulation tape is on the inner surface of the metallic cover.

6. The battery pack of claim 1, wherein the metallic cover comprises stainless steel.

7. The battery pack of claim wherein the metallic cover comprises:
   a first cover for covering the core pack from a first side; and a second cover for covering the core pack from a second side opposite to the first side, wherein a portion of each of the first cover and the second cover is open to expose the connector to the outside.

8. The battery pack of claim 7, wherein the protrusion is on at least one of the first cover or the second cover.

9. The battery pack of claim 7, further comprising a frame for accommodating the core pack and the protection circuit module and for coupling with the first cover and the second cover.

10. A battery pack comprising:
a core pack;
a protection circuit module electrically connected to the core pack and comprising a connector for further electrically connecting to an external electronic device;
a frame for accommodating the core pack and the protection circuit module; and
a metallic cover for covering the protection circuit module and the core pack while being electrically insulated from an outer surface of the core pack and exposing the connector to the outside, the metallic cover comprising an upper surface, a first side surface, and a second side surface, wherein the first and second side surfaces are each bent from the upper surface to cover the protection circuit module, are positioned on a same plane, are separate and are spaced apart from one another, such that the connector is exposed through a gap between the first side surface and the second side surface, and wherein one of the first side surface or the second side surface comprises a protrusion adjacent to a ground portion of the connector.

11. The battery pack of claim 10, further comprising an insulating layer between the metallic cover and the protection circuit module.

12. The battery pack of claim 10, wherein the metallic cover comprises:
a first cover positioned at a first side of the frame, wherein a portion of the first cover is open to expose the connector to the outside; and
a second cover positioned at a second side of the frame, wherein a portion of the second cover is open to expose the connector to the outside.

13. The battery pack of claim 12, wherein the protrusion is on at least one of the first cover or the second cover and is configured to contact the ground portion of the connector.

14. The battery pack of claim 10, wherein the frame comprises a first area for accommodating the core pack and a second area for accommodating the protection circuit module, wherein the second area includes at least one surface facing the metallic cover that is at least partially open.

15. The battery pack of claim 14, further comprising an insulating layer configured to cover the at least one open surface of the second area.

16. The battery pack of claim 10, wherein the frame comprises an insulating material.

17. The battery pack of claim 10, wherein the metallic cover comprises stainless steel.

18. The battery pack of claim 10, wherein an inner surface of the metallic cover is electrically insulated.

19. The battery pack of claim 18, wherein an oxide coating layer is on the inner surface of the metallic cover.

20. The battery pack of claim 18, wherein an insulation tape is on the inner surface of the metallic cover.

* * * * *